United States Patent
Sugaya et al.

(10) Patent No.: US 9,935,308 B2
(45) Date of Patent: Apr. 3, 2018

(54) TURBOSTRATIC MATERIAL, ACTIVE MATERIAL FOR ELECTRICITY STORAGE DEVICES, ELECTRODE, AND ELECTRICITY STORAGE DEVICE

(71) Applicants: PANASONIC CORPORATION, Osaka (JP); KYOTO UNIVERSITY, Kyoto (JP)

(72) Inventors: Hidetaka Sugaya, Shiga (JP); Katsutoshi Fukuda, Ibaragi (JP); Masahito Morita, Hyogo (JP); Yoshiharu Uchimoto, Kyoto (JP)

(73) Assignees: PANASONIC CORPORATION, Osaka (JP); KYOTO UNIVERSITY, Kyoto (JP)

( * ) Notice: Subject to any disclaimer, the term of this patent is extended or adjusted under 35 U.S.C. 154(b) by 447 days.

(21) Appl. No.: 14/644,099

(22) Filed: Mar. 10, 2015

(65) Prior Publication Data
US 2015/0263335 A1    Sep. 17, 2015

(30) Foreign Application Priority Data
Mar. 11, 2014   (JP) .................. 2014-047561

(51) Int. Cl.
*H01M 4/131* (2010.01)
*H01M 4/36* (2006.01)
(Continued)

(52) U.S. Cl.
CPC .......... *H01M 4/131* (2013.01); *C01G 39/00* (2013.01); *C01G 39/02* (2013.01); *H01M 4/0471* (2013.01); *H01M 4/0497* (2013.01); *H01M 4/366* (2013.01); *H01M 4/485* (2013.01); *C01P 2002/08* (2013.01); *C01P 2002/20* (2013.01); *C01P 2002/72* (2013.01);
(Continued)

(58) Field of Classification Search
None
See application file for complete search history.

(56) References Cited

U.S. PATENT DOCUMENTS

| | | | |
|---|---|---|---|
| 2004/0048161 | A1 | 3/2004 | Sunagawa et al. |
| 2006/0216607 | A1 | 9/2006 | Takeuchi et al. |
| 2008/0003503 | A1 | 1/2008 | Kawakami et al. |
| 2008/0171264 | A1 | 7/2008 | Takeuchi et al. |
| 2009/0104533 | A1 | 4/2009 | Takeuchi et al. |

FOREIGN PATENT DOCUMENTS

| | | |
|---|---|---|
| EP | 0600718 A2 | 6/1994 |
| JP | 2003-260368 A | 9/2003 |

(Continued)

OTHER PUBLICATIONS

Mikhailova et al., Layered LixMoO2 phases with different composition for electrochemical application: structural consideration, 2011, Chem. Mater. ,23, 3429-3441.*

(Continued)

*Primary Examiner* — Daniel Gatewood
(74) *Attorney, Agent, or Firm* — McDermott Will & Emery LLP

(57) ABSTRACT

There is provided molybdenum oxide for an active material of an electricity storage device having excellent rate characteristics and structural stability. A turbostratic material 1 has a turbostratic structure composed of a plurality of nanosheets 2, where the nanosheets have the composition $MoO_2$.

8 Claims, 2 Drawing Sheets

(51) Int. Cl.
  *H01M 10/054* (2010.01)
  *C01G 39/00* (2006.01)
  *C01G 39/02* (2006.01)
  *H01M 4/04* (2006.01)
  *H01M 4/485* (2010.01)

(52) U.S. Cl.
  CPC ...... *C01P 2004/24* (2013.01); *C01P 2006/40* (2013.01); *H01M 10/054* (2013.01); *Y10T 156/10* (2015.01)

(56) References Cited

FOREIGN PATENT DOCUMENTS

| JP | 2003-326637 A | 11/2003 |
| JP | 2003-331844 A | 11/2003 |
| JP | 2005-220001 A | 8/2005 |
| JP | 2008-174431 A | 7/2008 |
| JP | 2010-280977 A | 12/2010 |
| WO | 2005/040044 A2 | 5/2005 |

OTHER PUBLICATIONS

Zhang et al, Synthesis of MoO2 nanosheets by an ionic liquid route and its electrochemical properties, J. Alloys and compounds, 2013, 580, 358-362.*

D. Mikhailova, "Layered LixMoO2 Phases with Different Composition for Electrochemical Application: Structural Considerations," Chemistry of Materials, 23, 3429 (2011).

R.E. McCarley, "New Extended Clusters in Ternary Molybdenum Oxides," Journal of Solid State Chemistry, 57, 17 (1985).

D. S. Kim, et al., "Soft-Chemical Exfoliation of Na0.9Mo2O4: Preparation and Electrical Conductivity Characterization of a Molybdenum Oxide Nanosheet," Chem Mater, 23, 2700-2702, 2011.

J. H. Ku, et al., "Thermoelectrochemically Activated MoO2 Powder Electrode for Lithium Secondary Batteries," Journal of the Electrochemical Society, 156, 8, A688-A693, 2009.

L. Wang et al., "Fabrication and Characterization of Multilayer Ultrathin Films of Exfoliated MnO2 Nanosheets and Polycations," Chem. Mater., 2873-2878, 2003.

J. M. Tarascon, LixMo2O4 A Promising Cathode Material for Secondary Lithium Cells, J. Electrochem. Soc., vol. 134, No. 6, 1987.

M. Wang, et al., "Enhanced Lithium Storage Performances of Hierarchial Hollow MoS2 Nanoparticles Assembled from Nanosheets," Appl. Mater. Interfaces, 5, 1003-1008, 2013.

H. Sugaya, et al., "Electrochemical property of the restacked MoO2 nanosheets electrode in Lithium-ion battery," The Chemical Society of Japan, 2014.

* cited by examiner

TURBOSTRATIC MATERIAL, ACTIVE MATERIAL FOR ELECTRICITY STORAGE DEVICES, ELECTRODE, AND ELECTRICITY STORAGE DEVICE

RELATED APPLICATIONS

This application claims the benefit of Japanese Patent Application No. 2014-047561, filed on Mar. 11, 2014, the disclosure of which Application is incorporated by reference herein.

BACKGROUND

1. Technical Field

The present application relates to a novel molybdenum oxide, and more particularly to a molybdenum oxide for use as an active material of an electricity storage device, an active material for electricity storage devices, an electrode, and an electricity storage device.

2. Description of the Related Art

In recent years, various personal digital assistants such as tablet-type personal digital assistants and smartphones have become widely prevalent. As power sources of such personal digital assistants, electricity storage devices which are capable of repetitive charging and discharging, e.g., secondary batteries, are used. There are also needs for secondary batteries of much larger capacities than those for personal digital assistants. For example, from the standpoint of energy saving or the standpoint of reducing discharged amounts of carbon dioxide, hybrid vehicles, i.e., conventional automobile featuring internal combustion engines but also utilizing an electricity-based driving force, and also electric vehicles in which motors are used instead of internal combustion engines, are beginning to gain prevalence. Moreover, in order to utilize green energy as domestic or commercial power, larger-sized electricity storage devices are being studied for storing electric power which is generated from green energy. To this end, novel active materials for electricity storage devices are needed for improving the performance of electricity storage devices intended for various purposes.

Molybdenum oxides, which are capable of lithium insertion/release and have electron conductivity, are expected to provide excellent active materials for electricity storage devices. For example, D. Mikhailova "Layered $Li_xMoO_2$ Phases with Different Composition for Electrochemical Application: Structural Considerations" Chemistry of Materials, 23, 3429 (2011) (hereinafter "Non-Patent Document 1"), reports on using $MoO_2$ having a distorted rutile structure material as a negative-electrode active material.

SUMMARY

It is desirous for conventional molybdenum oxides to have better rate characteristics and structural stability. A non-limiting, illustrative embodiment of the present application provides a molybdenum oxide having better rate characteristics and structural stability.

A turbostratic material according to one implementation of the present invention contains molybdenum oxide. The molybdenum oxide has the composition $MoO_2$ and constitutes a plurality of nanosheets.

A turbostratic material according to one implementation of the present invention can be used as an electrode active material for an electricity storage device having excellent cycle characteristics and capable of charge/discharge at high rates.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

DETAILED DESCRIPTION

Figure 1A:
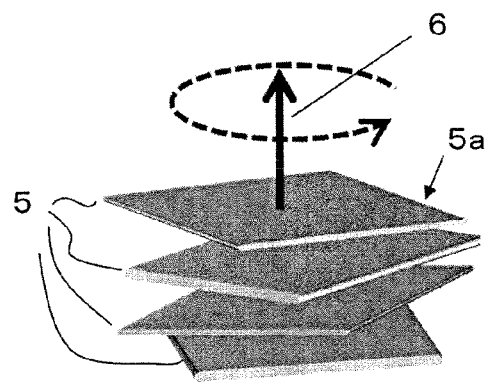
FIG. 1A is a schematic diagram showing a turbostratic structure.

The $MoO_2$ as conventionally used for electricity storage devices such as lithium secondary batteries or the like have a distorted rutile structure. In this structure, Li follows a one-dimensional path to be inserted into the distorted rutile structure, or released from the distorted rutile structure. Therefore, it is considered that there is low freedom for Li movement at insertion/release, making it difficult to enhance the charge/discharge rates.

Moreover, according to the report in Non-Patent Document 1, structural phase transitions are believed to occur in the charge/discharge processes. Thus, it is considered that at charge/discharge the capacity may decrease or the charge-discharge potential may change, thus deteriorating the cycle characteristics.

In view of these problems, the inventors have succeeded in the synthesis of a molybdenum oxide having a novel structure, and have found that the resultant molybdenum oxide has excellent characteristics as an active material for electricity storage devices. In summary, one implementation of the invention is as follows.

A turbostratic material according to one implementation of the present invention contains molybdenum oxide.

The molybdenum oxide may have the composition $MoO_2$ and constitute a plurality of nanosheets.

The turbostratic material may contain cations or amines located between the plurality of nanosheets.

The cations may include at least one selected from the group consisting of alkali metal ions and ammonium ions.

The cations may be $Li^+$.

An active material for electricity storage devices according to one implementation of the present invention contains any of the above turbostratic materials.

An electrode according to one implementation of the present invention comprises: an electrically conductive support; and an electricity storage layer on the electrically conductive support, the electricity storage layer containing the above active material for electricity storage devices.

An electricity storage device according to one implementation of the present invention comprises: a positive electrode, a negative electrode, and an electrolyte, wherein at least one selected from the positive electrode and the negative electrode contains any of the above turbostratic materials as an active material.

A method of producing a turbostratic material according to one implementation of the present invention comprises: (a) providing a layered molybdenum oxide expressed by the general formula $A_xMoO_2$ (where A is at least one selected from among alkali metals; $x \leq 1$); (b) obtaining, in a liquid, a plurality of nanosheets of molybdenum oxide from the layered molybdenum oxide; and (c) stacking the plurality of nanosheets and isolating a turbostratic material.

Step (a) may comprise mixing and baking at least two starting materials including an alkali metal and molybdenum.

The at least two starting materials may include Mo, $MoO_2$, and $Na_2MoO_4$.

Step (b) may comprise replacing A in the layered molybdenum oxide expressed by the general formula $A_xMoO_2$ with another cation, to thereby obtain a plurality of nanosheets of molybdenum oxide.

Step (b) may comprise treating the layered molybdenum oxide with an acid, followed by a reaction with an aqueous solution containing quaternary ammonium ions.

Step (c) may comprise drying by heating the plurality of nanosheets in the liquid obtained at step (b).

Step (c) may comprise drying by freezing the plurality of nanosheets in the liquid obtained at step (b).

Step (c) may comprise adjusting pH of the liquid obtained at step (b) to allow the turbostratic material to precipitate.

First Embodiment

The novel molybdenum oxide which has been found by the inventors has a turbostratic structure. Hereinafter, this molybdenum oxide, which encompasses various implementations, will be referred to as a turbostratic material in the present specification.

A turbostratic material 1 according to the present embodiment has a turbostratic structure, and contains molybdenum oxide. A turbostratic structure means, as shown in FIG. 1A, a structure in which a plurality of sheet-like crystal structures 5 are stacked. In the turbostratic structure, respective basal planes of the 5a crystal structures 5 are disposed so that a certain crystallographic axis 6 which is non-parallel to each basal plane 5a approximately matches in their direction; however, the respective crystal structures 5 are rotated around the crystallographic axis 6 at arbitrary angles. In other words, between crystal structures 5, the two crystallographic axes which are parallel to the basal plane 5a do not match in direction. Such a structure is expressed also as a stacking mismatch. Generally speaking, any compound (including those in nature) having a layered crystalline structure which is formed by way of thermodynamic equilibrium has their layers stacked with a match, thus not resulting in a turbostratic structure. It is considered that some weak interaction is acting between the layered crystal structures 5. Although the crystallographic axis 6 is illustrated in the figure as running in a direction perpendicular to the basal plane 5a, the crystallographic axis 6 may be non-perpendicular to the basal plane 5a.

Figure 1B:
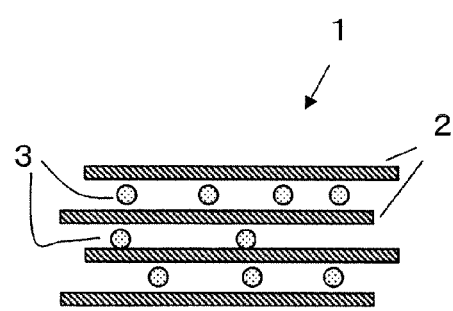
FIG. 1B is a schematic diagram showing the structure of a turbostratic material according to a first embodiment.

As shown in FIG. 1B, in the turbostratic material 1, the molybdenum oxide constitutes a plurality of nanosheets having the composition $MoO_2$ 2. The plurality of nanosheets 2 compose a turbostratic structure. In other words, the turbostratic material 1 contains a molybdenum oxide having a turbostratic structure. The nanosheets 2 have a size on the order of submicrons to several microns in the plane direction. For example, they have a size inscribable in a circle whose diameter is not less than 0.1 μm and not more than 5 μm. The nanosheets 2 may have a larger size, e.g., a size inscribable in a circle whose diameter is on the order of several dozen μm to several millimeters. The crystallographical thickness of the nanosheets 2 is about 1 nm. The nanosheets 2 have the aforementioned $MoO_2$ composition, and are structured so that a layer having Mo disposed therein is sandwiched between two layers having oxygen disposed therein. As will be described below, the size of the nanosheets 2 depends on the size of the starting material which is used when producing the turbostratic material 1, and can be adjusted based on the type of starting material and the synthesis method for the starting material.

The plurality of nanosheets 2 composing the turbostratic structure are disposed with air gaps therebetween, in a manner not contacting each other, and function as host layers such that cations can be inserted in these air gaps. As shown in FIG. 1B, the turbostratic material 1 may contain cations 3 or amines 3 located between the plurality of nanosheets 2. The cations 3 are, for example, at least one selected from the group consisting of $H^+$, $H_3O^+$, alkali metal ions, and ammonium ions. More specifically, they may be at least one selected from the group consisting of $H^+$, $H_3O^+$, Li, Na, K, Rb, Cs, tetrabutylammonium ions ($TBA^+$), tetrapropylammonium ions, tetraethylammonium ions, tetramethylammonium ions, and the like.

The amines 3 are, for example, at least one selected from the group consisting of n-propylamine, n-ethylamine, ethanolamine, and the like. Depending on the oxidation state (degree of oxidation) of the molybdenum oxide, the turbostratic material 1 contains the aforementioned cations 3 or amines 3. In order to secure large intervals between the nanosheets 2 and allow Li or the like to be inserted or released, the turbostratic material 1 may contain bulky anions or amines. For example, organic ammonium ions or amines may be contained.

The turbostratic material 1 has a turbostratic structure of nanosheets 2, and through oxidation/reduction of Mo in the molybdenum oxide, allows cations such as Li to be inserted in the interlayer gallery between the plurality of nanosheets 2. Although the interval between nanosheets 2 may somewhat change due to insertion or release of cations, no significant change occurs in the structure of the nanosheets composed of molybdenum oxide. Therefore, when the turbostratic material 1 is used as an active material of an electricity storage device, the turbostratic material undergoes little change in structure with charge/discharge, such that structural destruction or the like is unlikely to be caused by repeated charging and discharging. In other words, the turbostratic material 1 of the present embodiment is stable, and has good cycle characteristics. Moreover, as will be described below, a turbostratic structure of stacked nanosheets is an artificial material which is induced through a thermodynamic nonequilibrium process, thus providing an essential cure for any structural rearrangement or structural phase transition associated with a thermodynamic equilibrium process. In this aspect, the turbostratic material 1 is able to avoid the structural phase transition associated with charge/discharge, which is a disadvantage of $MoO_2$ having a distorted rutile structure or molybdenum dioxide having a conventional regular crystalline structure.

Moreover, in the turbostratic material 1, cations such as Li move through the two-dimensional spaces expanding between the plurality of nanosheets 2. Since this allows for high freedom concerning the movement of cations such as Li, cations such as Li can be inserted or released at a higher rate than the conventional molybdenum oxides during charge or discharge. Therefore, when the turbostratic material 1 is used as an active material of an electricity storage device, it is possible to realize high rate characteristics, e.g., rate characteristics which are twice as high as, or even greater than, those of $MoO_2$ having a distorted rutile structure. Furthermore, when producing an electricity storage device whose positive electrode is $LiCoO_2$ and whose negative electrode is the turbostratic material 1, a capacity will be obtained which is greater than 198 $mAhg^{-1}$, i.e., the stoichiometric capacity of $MoO_2$ having a distorted rutile structure.

Moreover, in the turbostratic material 1, the plurality of nanosheets 2 compose a turbostratic structure, such that the crystals of the plurality of nanosheets 2 are not matched in the direction in which the plurality of nanosheets 2 are stacked. Therefore, the turbostratic material 1 has a lowered crystallinity as a whole, and thus is able to undergo oxidation/reduction at a lower potential than that for $MoO_2$ having a distorted rutile structure. Specifically, the oxidation-reduction potential of the turbostratic material 1 is lower than 1.25 V ($vsLi/Li^+$) by 0.1 V or more. Therefore, when the turbostratic material 1 is used as a negative electrode material for a lithium secondary battery, deposition of lithium dendrites can be suppressed because the oxidation-reduction potential of the turbostratic material is sufficiently higher than the oxidation-reduction potential of lithium. Moreover, since it is lower than the oxidation-reduction potential (1.5 V ($vsLi/Li^+$)) of lithium titanium oxide ($Li_4Ti_5O_{12}$), a lithium secondary battery with a higher output voltage can be realized than in the case of using lithium titanium oxide as the negative electrode material, thus enabling a high energy efficiency.

Next, a method of producing the turbostratic material 1 will be described. The method of producing the turbostratic material according to the present embodiment involves (a) providing a layered molybdenum oxide, (b) obtaining nanosheets of molybdenum oxide from the layered molybdenum oxide, and (c) stacking the plurality of nanosheets and isolating the turbostratic material. Hereinafter, these steps will be described in order.

(a) Step of Providing a Layered Molybdenum Oxide

First, a layered molybdenum oxide is provided. The layered molybdenum oxide has a composition expressed by the general formula $A_xMoO_2$ (where A is at least one selected from among alkali metals; $x \leq 1$). The layered molybdenum oxide is structured so that layers of molybdenum oxide expressed as $MoO_2$ and layers on which an alkali metal disposed are alternately stacked. The layered molybdenum oxide is obtained by baking, i.e., by way of thermodynamic equilibrium. Therefore, in the layered molybdenum oxide having a composition expressed by the general formula $A_xMoO_2$, the layer of molybdenum oxide does not have a turbostratic structure.

Although stoichiometrically the layered molybdenum oxide has the composition $AMo_2O_4$, A may be deviated from this composition ratio, so long as $A_xMoO_2$, $x \leq 1$ is satisfied and host layers of molybdenum oxide expressed as $MoO_2$ are included. Layered molybdenum oxides are explained in, for example, McCarley, R. E. "New Extended Clusters in Ternary Molybdenum Oxides" Journal of Solid State Chemistry, 57, 17 (1985). Their synthesis methods are described in, for example, KIM Dae Sung et al., "Soft-Chemical Exfoliation of $Na_{0.9}Mo_2O_4$: Preparation and Electrical Conductivity Characterization of a Molybdenum Oxide Nanosheet", Chem Mater, 23, 2700-2702, 2011.

The layered molybdenum oxide can be synthesized by mixing starting materials containing an alkali metal and Mo, and baking them. As the starting materials, for example, Mo, $MoO_2$, and $A_2MoO_4$ (where A is an alkali metal) can be used. The bake temperature is not less than 670° C. and not more than 1000° C., for example, and the bake time is not less than 1 hour and not more than 96 hours. In order to obtain samples with good crystallinity while also giving considerations to cost, about 36 hours is desirable. The layered molybdenum oxide determines the size of the nanosheets to be contained in the turbostratic material. Therefore, the nanosheet size can be controlled to a certain degree by adjusting the bake time and bake temperature, and controlling the size of the crystal grains of the layered molybdenum oxide.

(b) Step of Obtain Nanosheets of Molybdenum Oxide

The resultant baked body is immersed in an acidic aqueous solution such as hydrochloric acid, and at least part of the A in the layered molybdenum oxide expressed by the general formula $A_xMoO_2$ is substituted with $H^+$ or $H_3O^+$. As a result, $H_xMo_2O_4 \cdot nH_2O$ is obtained, with an expanded interval between host layers that are expressed as $MoO_2$.

Next, the layered molybdenum oxide with $H^+$ substitution is placed in an aqueous solution containing bulky cations or amines, and agitated or shaken. The bulky cations or amines function as a delamination promoter. For example, an aqueous solution containing ammonium ions such as tetrabutylammonium ions ($TBA^+$), tetrapropylammonium ions, tetraethylammonium ions, and tetramethylammonium ions, or amines such as n-propylamine, n-ethylamine, and ethanolamine is used. As a result, the layered molybdenum oxide is delaminated into pieces on the order of nanometers, so that a colloidal liquid having the separated nanosheets 2 dispersed therein is obtained.

(c) Step of Isolating Turbostratic Material

Next, nanosheets of $MoO_2$ dispersed in the liquid are stacked, and then isolated. At this time, in order to allow alkali metal ions or organic molecules to be sandwiched between the nanosheets, an alkali metal such as $Li^+$ ions, or the electrolyte, organic molecules, etc., that are contained in the electrolyte solution of the electricity storage device, may be intentionally added to the colloidal liquid. Note here that to "isolate" means to enhance the purity of or remove impurities from the turbostratic material 1 of the present embodiment to a point where it is usable as an electricity storage device, or separating the turbostratic material 1 in a state such that it is usable as an electricity storage device. So far as this requirement is met, the turbostratic material 1 may contain any other impurities.

Stacking of nanosheets can be modulated by, for example, varying the pH or electrolyte concentration of the colloidal liquid to introduce a drastic change in the liquid phase environment, and inducing spontaneous aggregation of the dispersed nanosheets of $MoO_2$. Since there is no alignment of crystal orientations between the neighboring nanosheets, a turbostratic structure is created. For example, through dropwise application of an acidic solution to the colloidal solution to lower its pH, the turbostratic material 1 of stacked nanosheets will settle. By separating this precipitate and drying it, the turbostratic material 1 is obtained.

Stacking of nanosheets can also be modulated by removing the liquid component from the colloidal solution, i.e., drying it. For example, the colloidal solution may be dried by heating or dried by freezing.

By utilizing the aforementioned method of producing, various substances other than alkali metals can be interposed between $MoO_2$ nanosheets of the turbostratic material 1 of the present embodiment.

For example, at the aforementioned step (c), by utilizing an electrostatic self-organization reaction with organic polymers such as polycations, or an inorganic polymer obtained through delamination of a composite hydroxide, etc., a turbostratic material that contains not only small cations but also a heterogenous nanosubstance between nanosheets can be obtained. Moreover, by permitting a similar reaction on various kinds of substrates (e.g., Si, $SiO_2$, ITO, Al, or Ni), a layer-by-layer film formation also becomes possible. For example, a layer-by-layer alternate stacking with organic cations may be conducted on an $SiO_2$ substrate for covering its surface, thereby constructing a thin film material of the molybdenum oxide having a turbostratic structure. This can open doors to applications of extremely-thin electricity storage elements.

Second Embodiment

Figure 2:
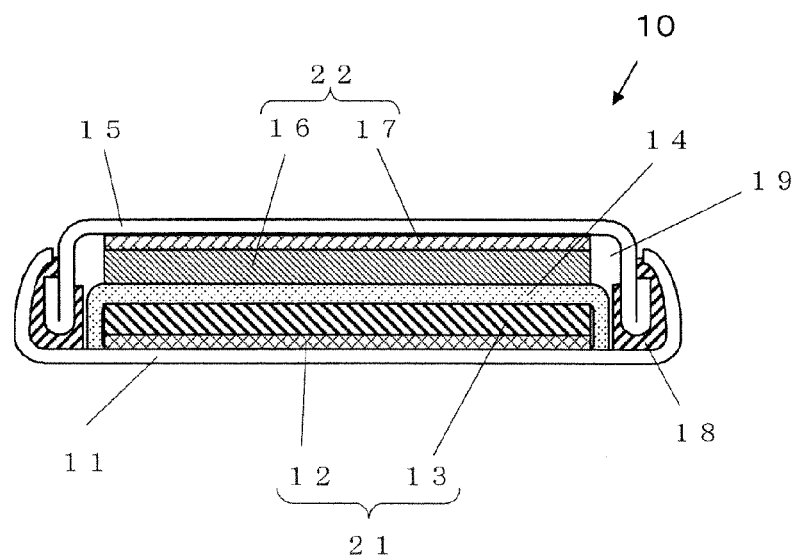
FIG. 2 is a cross-sectional view showing the structure of a secondary battery according to a second embodiment.

An embodiment of an electricity storage device according to the present invention will be described. In the present embodiment, a coin-type lithium secondary battery will be illustrated as the electricity storage device. As shown in FIG. 2, the lithium secondary battery 10 includes a positive electrode 21, a negative electrode 22, a separator 14 placed between the positive electrode 21 and the negative electrode 22, and an electrolyte 19. These elements are accommodated in a case 11, with the use of a gasket 18 and a sealing plate 15. One of the positive electrode 21 and the negative electrode 22 contains the turbostratic material 1 according to the first embodiment as an electrode active material. When the turbostratic material according to the first embodiment is used for one of the positive electrode 21 and the negative electrode 22, a conventional electrode active material can be used for the other.

For example, the positive electrode 21 includes a positive current collector 12 and a positive-electrode active material layer 13 which is formed on the positive current collector 12. The positive-electrode active material layer 13 is interposed between the positive current collector 12 and the separator 14, so as to be in contact with both the positive current collector 12 and the separator 14.

As the positive current collector 12, for example, a porous or nonporous sheet made of a metal material such as aluminum, a stainless steel, or an aluminum alloy can be used. As a sheet of metal material, for example, a metal foil or a meshed body is used, for example. For the sake of (i) reduction of electrode resistance, (ii) impartment of a catalytic effect, and (iii) enhancement of the bond between the positive-electrode active material layer 13 and the positive current collector 12 through chemical or physical bonding between the positive-electrode active material layer 13 and the positive current collector 12, a carbon material, e.g., carbon, may be applied on the surface of the positive current collector 12.

The positive-electrode active material layer 13 is to be provided on at least one surface of the positive current collector 12. The positive-electrode active material layer 13 contains a positive-electrode active material, and as necessary, may also contain an electro-conductive agent, an ion conductive agent, a binder agent, or the like.

Electro-conductive agents and ion conductive agents are used for reducing electrode resistance. Examples of electro-conductive agents include carbon materials, e.g., carbon black, graphite, and acetylene black, and electrically-conductive polymer compounds, e.g., polyaniline, polypyrrole, and polythiophene. Examples of ion conductive agents include gel electrolytes, e.g., polymethylmethacrylate and polymethyl methacrylate, and solid electrolytes, e.g., polyethylene oxide.

The positive electrode 21 can be produced by: mixing a positive-electrode active material (e.g. a nitrogen-containing orthoquinone compound), an electro-conductive agent, and a binder agent, each in powder form; producing a sheet by using the mixture; and crimping the produced sheet into a sheet-shaped or meshed current collector. The positive electrode 21 can also be produced by: preparing a slurry by mixing a positive-electrode active material, an electro-conductive agent, a binder agent, and an organic solvent; applying the slurry to a current collector; and thereafter removing the organic solvent. In this case, the positive-electrode active material may be dissolved in an organic solvent, and thereafter other materials such as an electrical conductivity agent and a binder agent may be mixed to prepare a slurry, and this slurry may be used to produce the positive electrode 21.

The slurry can be prepared by dissolving an electrode active material in an aprotic solvent, and mixing the resultant solution with an electro-conductive agent. It is also possible to dissolve an electrode active material in a mixture that contains an aprotic solvent and an electro-conductive agent. Moreover, the mixture may contain a binder agent. As the binder agent, those which will be mentioned later can be used. The electro-conductive agent and the binder agent may not be dissolved in an aprotic solvent. In the case where the mixture contains a binder agent, the order of mixing the respective materials may be arbitrary. It is desirable that the electrode active material is dissolved in an aprotic solvent, and uniformly dispersed. In the case where the electrode active material is dissolved in an aprotic solvent and mixed with an electro-conductive agent, the electrode active material will coat, in a molecular state, the surface of the electro-conductive agent. Therefore, in order to ensure uniform dispersion, it is desirable for the electrode active material to be dissolved in an aprotic solvent.

There is no particular limitation as to the aprotic solvent. Those which have high affinity with the aforementioned electrode active material are preferable. Specifically, aprotic solvents such as N-methylpyrrolidone (NMP), 1,3-dimethyl-2-imidazolidinone (DMI), tetrahydrofuran (THF), toluene, dimethylformamide (DMF), dimethyl acetamide (DMAc), dimethyl sulfoxide (DMSO), and chloroform are preferable, among which NMP, DMI, and THF are the more preferable.

The binder agent is used for improving the binding ability of the electrode-composing material, for example. Examples of binder agents include polyvinylidene fluoride, vinylidene fluoride-hexafluoropropylene copolymers, vinylidene fluoride-tetrafluoroethylene copolymers, polytetrafluoroethylene, styrene-butadiene rubber, polypropylene, polyethylene, and polyimide.

The negative electrode 22 includes, for example, a negative current collector 17 and a negative-electrode active material layer 16 which is formed on the negative current collector 17. The negative-electrode active material layer 16 is interposed between the negative current collector 17 and the separator 14, so as to be in contact with both the negative current collector 17 and the separator 14.

In addition to what was mentioned for the positive current collector 12, a porous or nonporous sheet of metal materials such as copper, nickel, copper alloys, and nickel alloys can be used for the negative current collector 17. For the sake of reduction of electrode resistance, impartment of a catalytic effect, and enhancement of the bond between the negative-electrode active material layer 16 and the negative current collector 17, a carbon material may be applied on the surface of the negative current collector 17.

The negative-electrode active material layer 16 is to be provided on at least one face of the negative current collector 17. The negative-electrode active material layer contains a negative-electrode active material, and as necessary, may also contain an electro-conductive agent, an ion conductive agent, a binder agent, or the like. Specifically, the same electro-conductive agent, ion conductive agent, and binder agent as are contained in the positive-electrode active material layer 13 can be used.

In the case where the turbostratic structure according to the first embodiment is used for the positive electrode 21, graphite, metal lithium, or the like can be used for the negative-electrode active material.

In the case where the electrode active material according to the first embodiment is used for the negative electrode 22, lithium-containing metal oxides such as $LiCoO_2$, $LiNiO_2$, and $LiMn_2O_4$, or activated carbon and the like can be used for the positive-electrode active material.

As the separator 14, a material having a predetermined ion transmission, mechanical strength, and electrical insulation ability is used, e.g., a microporous sheet, a woven fabric, or a nonwoven fabric. Microporous sheets, woven fabrics, and nonwoven fabrics are usually made of a resin material. From the standpoint of durability, shutdown function, and battery safety, the separator 14 is preferably made of a polyolefin such as polyethylene or polypropylene. Note that the shutdown function is a function of, when the amount of heat generation in the battery 10 has greatly increased, stopping the battery reaction based on the throughholes becoming closed and thus suppressing ion transmission.

As an electrolyte, for example, liquid electrolytes, solid electrolytes, gel electrolytes, and the like can be used. The liquid electrolyte contains a solvent and a supporting salt. As the supporting salt, supporting salts which are usually used for lithium ion batteries and nonaqueous-type electric double-layer capacitors can be used. Specifically, supporting salts which are composed of the following cations and anions are possible. Examples of cations that can be used include: cations of alkali metals such as lithium, sodium, and potassium; cations of alkaline-earth metals such as magnesium; and cations of quaternary ammoniums such as tetraethylammonium and 1,3-ethylmethylimidazolium. These cations may be used each by itself, or two or more kinds may be used in combination. Examples of anions include halide anions, perchlorate anions, trifluoromethanesulfonate anions, tetrafluoroboric anions, trifluorophosphorus hexafluoride anions, trifluoromethanesulfonate anions, bis(trifluoromethanesulfonyl)imide anions, and bis(perfluoroethylsulfonyl)imide anions. These anions may be used each by itself, or two or more kinds may be used in combination. As the supporting salt, lithium salts of lithium cations and the aforementioned anions are preferable.

In the case where the supporting salt itself is in liquid form, the supporting salt and a solvent may be mixed, or not mixed. In the case where the supporting salt is in solid form, it is preferable to use as an electrolyte a solution which is obtained by dissolving the supporting salt in an appropriate solvent. As the solvent, those which are commonly used in the fields of lithium ion batteries and nonaqueous-type electric double-layer capacitors can be used, e.g., ethylene carbonate, propylene carbonate, dimethyl carbonate, diethyl carbonate, methylethyl carbonate, γ butyl lactone, tetrahydrofuran, dioxolane, sulfolane, dimethylformamide, and acetonitrile. These organic solvents may be used each by itself, or two or more kinds may be used in combination.

Examples of solid electrolytes include: $Li_2S$—$SiS_2$—lithium compound (where the lithium compound is at least one selected from the group consisting of $Li_3PO_4$, LiI, and $Li_4SiO_4$); $Li_2S$—$P_2O_5$; $Li_2S$—$B_2S_5$; $Li_2S$—$P_2S_5$—$GeS_2$; sodium/alumina ($Al_2O_3$); amorphous polyethers with low phase transition temperature (Tg); amorphous vinylidene fluoride copolymers; a blend of heterogenous polymers; and polyethylene oxide.

Examples of gel electrolytes include mixtures of resin materials, solvents, and supporting salts. Examples of resin materials include polyacrylonitrile, copolymers of ethylene and acrylonitrile, and polymers obtained by cross-linking them. As the solvent, for example, low-molecular weight organic solvents such as ethylene carbonate and propylene carbonate can be used. As the supporting salt, those same as above can be used. The solid electrolyte and the gel electrolyte can double as the separator 14.

Other than the aforementioned lithium secondary battery, the electricity storage device according to the present embodiment can be implemented as various primary batteries, secondary batteries, and capacitors. A capacitor may be constructed by using an electrode for which the electrode active material according to the first embodiment is used and a counter electrode containing activated carbon.

Example

Hereinafter, an example of producing the turbostratic material according to the first embodiment and assembling a battery, and measuring its characteristics, will be described.

1. Production and Identification of Turbostratic Material

Figure 3:
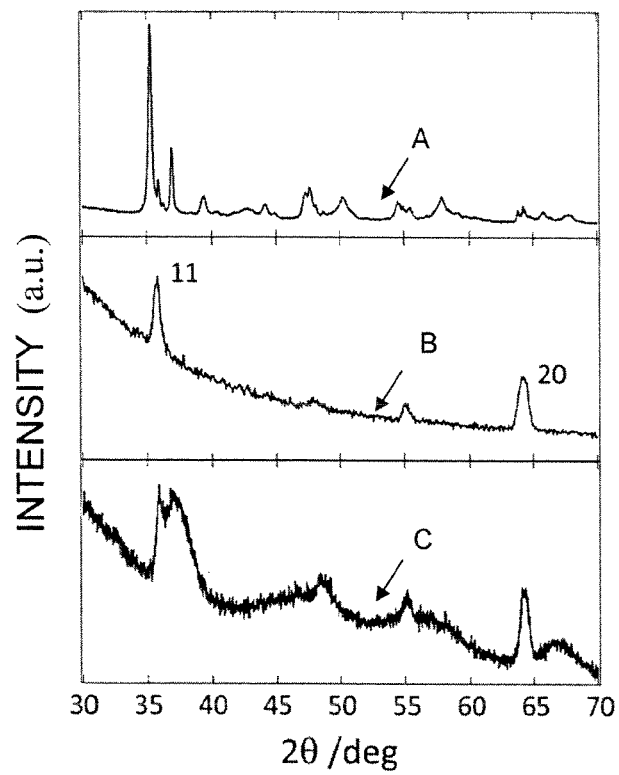
FIG. 3 shows an X-ray diffraction chart A of $H_xMo_2O_4 \cdot nH_2O$, an X-ray diffraction chart B of an $MoO_2$ nanosheet, and an X-ray diffraction chart C of a turbostratic material according to Example.

First, $Na_{0.9}Mo_2O_4$ was synthesized as a layered molybdenum oxide to serve as a starting material of the turbostratic material. Mo, $MoO_2$, and $Na_2MoO_4$ were weighed to attain a ratio of 0.85:1:2.55, and mixed. Under the vacuum condition, the mixture was baked at 750° C. for 36 hours. Thereafter, the baked material was rapidly cooled to room temperature. The flux component which had not reacted with the $Na_{0.9}Mo_2O_4$ obtained through baking was washed away with water. Then, the baked material was immersed in hydrochloric acid, followed by agitation. FIG. 3 shows an X-ray diffraction chart A of the recovered solid component. From FIG. 3, it was confirmed that $H_xMo_2O_4 \cdot nH_2O$, with an expanded distance between the host layers made of $MoO_2$ had been obtained in a single phase.

Next, $TBA^+$ was added to the resultant solution containing $H_xMo_2O_4 \cdot nH_2O$ so that the tetrabutylammonium ions ($TBA^+$) and the $H^+$ in $H_xMo_2O_4 \cdot nH_2O$ were 1:1, and the mixture was shaken well. Thus, a colloidal solution having $MoO_2$ nanosheets dispersed therein, and containing unreacted substance, was obtained. FIG. 3 also shows an X-ray diffraction chart B in an in-plane direction of the $MoO_2$ nanosheet. Four diffraction peaks, which are ascribable to the two-dimensional rectangular unit cells of the $MoO_2$ nanosheets, were confirmed in this 2θ range. It is to be noted that "11" and "20" are miller indices associated with the two-dimensional rectangular unit cells, respectively.

Next, the molybdate nanosheet colloidal solution was centrifuged at 3000 rpm for 30 minutes, and the precipitate was removed, thereby removing any component that had not separated themselves as nanosheets. Hydrochloric acid was added dropwise to the nanosheet colloidal solution with increased purity, whereby a sediment occurred. The precipitate was collected through filtration and dried. FIG. 3 shows an XRD diffraction chart C of the resultant product. As can be seen form FIG. 3, peaks corresponding to the 11 peak and 20 peak in the X-ray diffraction chart B are draped over towards the higher angle side in the XRD diffraction chart C. This indicates that the resultant product is a turbostratic material of $MoO_2$ nanosheets where the $MoO_2$ nanosheets are overlaid with stacking mismatch. Although not shown in the figure, it was found from the XRD pattern at low angles of 2 to 10 degrees that $H^+$ or $H_3O^+$, and also $TBA^+$, were trapped between layers. From these, the product was confirmed to be the turbostratic material 1 containing $H^+$ or $H_3O^+$ and $TBA^+$.

2. Production of Secondary Battery and Characteristics Evaluation

The synthesized turbostratic material, carbon powder as an electro-conductive agent, and polyvinylidene fluoride (PVDF) as a binder agent were weighed to attain a ratio by weight of 80:10:10 and mixed, and shaped into a film on the surface of an aluminum foil or copper foil as a current collector foil. This was dried at 80° C. for 60 min or more, and cut out into a 25 mm×15 mm size; to this, a nickel lead wire was adhesively bonded with an ultrasonic welding machine, thereby obtaining an electrode. As a counter electrode, a piece of lithium metal having an aluminum lead wire adhesively bonded thereto was used. The electrode and the counter electrode were opposed to each other via a separator, and set in an aluminum laminate container. After adding several drops of an ethylene carbonate/ethyl methyl carbonate (3:7) solution of lithium hexafluorophosphate (1 M), the aluminum laminate container was closed airtight, thus producing an aluminum laminate battery; this is designated a battery of the Example. Moreover, by using a conventional molybdenum dioxide as an active material, a battery of a similar structure was also produced; this is designated a battery of the Comparative Example.

Figure 4:
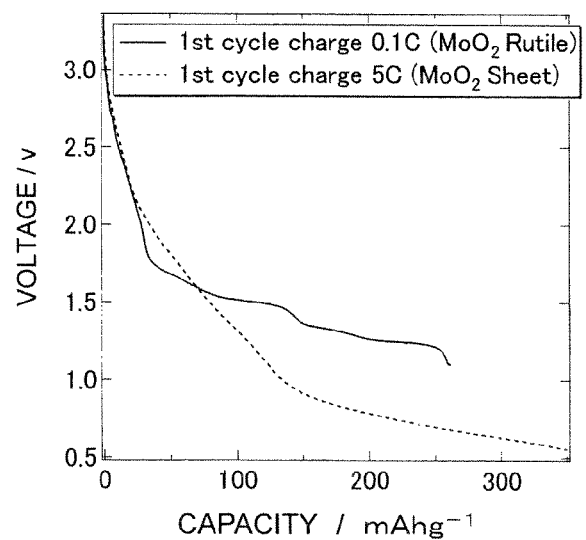
FIG. 4 is a diagram showing charge curves according to Example and Comparative Example.

Charge/discharge curves of the produced batteries are shown in FIG. 4. A solid line represents a charge curve of the battery of the Comparative Example (i.e., a battery in which a conventional molybdenum dioxide having a distorted rutile structure is used as the active material), and a dotted line represents a charge curve of the battery of the Example (i.e., a battery in which the turbostratic material according to the embodiment is used as the active material). The battery of the Comparative Example was charged while setting an upper limit voltage and a lower limit voltage of 2.5 V and 1.1 V, respectively. The battery of the Example was charged while setting an upper limit voltage and a lower limit voltage of 2.5 V and 0.5 V, respectively. Although the battery of the Comparative Example was able to charge at a rate of 0.1C ($6.6\times10^{-3}$ $mAhg^{-1}$), it was unable to charge at a rate of 5C ($3.3\times10^{-1}$ $mAhg^{-1}$). On the other hand, the battery of the Example was able to charge at a rate of 5C. This indicated that the battery of the Example was able to charge at a high rate than a conventional battery in which $MoO_2$ having a distorted rutile structure is used.

Moreover, the battery of the Example was able to charge at a voltage which was lower by 0.5 V or more than that of the battery of the Comparative Example, indicating that the turbostratic material used for the battery of the Example had an oxidation-reduction potential which was lower by 0.5 V or more than that of a conventional molybdenum dioxide having a distorted rutile structure.

Also, it was learned from FIG. 4 that the battery of the Example exhibited a smoother potential change than conventionally within the set voltage range. It was also found that a charge capacity exceeding 198 $mAhg^{-1}$, which is the stoichiometric capacity when charging $MoO_2$ to become $LiMoO_2$, can be realized.

The turbostratic material disclosed herein can be used as an active material of various electricity storage devices, e.g., lithium batteries, electrochemical capacitors, and hybrid electrochemical energy devices therebetween. Moreover, the electricity storage device disclosed herein can be used for personal digital assistants, hybrid vehicles, power storage, and so on.

While the present invention has been described with respect to exemplary embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Applications No. 2014-047561 filed on Mar. 11, 2014 the entire contents of which are hereby incorporated by reference.

What is claimed is:

1. A turbostratic material containing molybdenum oxide.

2. The turbostratic material of claim 1, wherein the molybdenum oxide has the composition $MoO_2$ and constitutes a plurality of nanosheets.

3. The turbostratic material of claim 2, wherein the turbostratic material contains cations or amines located between the plurality of nanosheets.

4. The turbostratic material of claim 3, wherein the cations include at least one selected from the group consisting of alkali metal ions and ammonium ions.

5. The turbostratic material of claim 4, wherein the cations are $Li^+$.

6. An active material for electricity storage devices containing the turbostratic material defined by claim 1.

7. An electrode comprising:
an electrically conductive support; and
an electricity storage layer on the electrically conductive support, the electricity storage layer containing the active material for electricity storage devices of claim 6.

8. An electricity storage device comprising:
a positive electrode, a negative electrode, and an electrolyte, wherein
at least one selected from the positive electrode and the negative electrode contains the turbostratic material of claim 1 as an active material.

* * * * *